2 Sheets--Sheet 1.

B. HERSHEY.

Machine for Welding Chain Links.

No. 6,589. Reissued Aug. 10, 1875.

Witnesses:
Edwin James
John H. Jones.

Inventor:
Benjamin Hershey
per J. E. J. Holmead,
Attorney

N. PETERS, PHOTO-LITHOGRAPHER, WASHINGTON, D. C.

B. HERSHEY.

Machine for Welding Chain Links.

No. 6,589. Reissued Aug. 10, 1875.

Witnesses:
Edwm James.
John K. Jones.

Inventor:
Benjamin Hershey.
per J. E. H. Holmead,
Attorney.

N. PETERS, PHOTO-LITHOGRAPHER, WASHINGTON, D. C.

UNITED STATES PATENT OFFICE.

BENJAMIN HERSHEY, OF ERIE, PENNSYLVANIA, ASSIGNOR, BY MESNE ASSIGNMENTS, TO THE PITTSBURGH CHAIN AND CAR-LINK MANUFACTURING COMPANY.

IMPROVEMENT IN MACHINES FOR WELDING CHAIN-LINKS.

Specification forming part of Letters Patent No. 139,151, dated May 20, 1873; reissue No. 6,589, dated August 10, 1875; application filed July 12, 1875.

*To all whom it may concern:*

Be it known that I, BENJAMIN HERSHEY, of the city and county of Erie, and State of Pennsylvania, invented certain Improvements in Chain-Machines, on which Letters Patent of the United States were granted to me, bearing date May 20, 1873, and numbered 139,151; that the Pittsburgh Chain and Car-Link Manufacturing Company are now the owners, through mesne assignments, of said Letters Patent, and that the following is a full, clear, and exact description, reference being had to the accompanying drawing and the letters of reference marked thereon, making part of this specification, in which—

Figure 1:
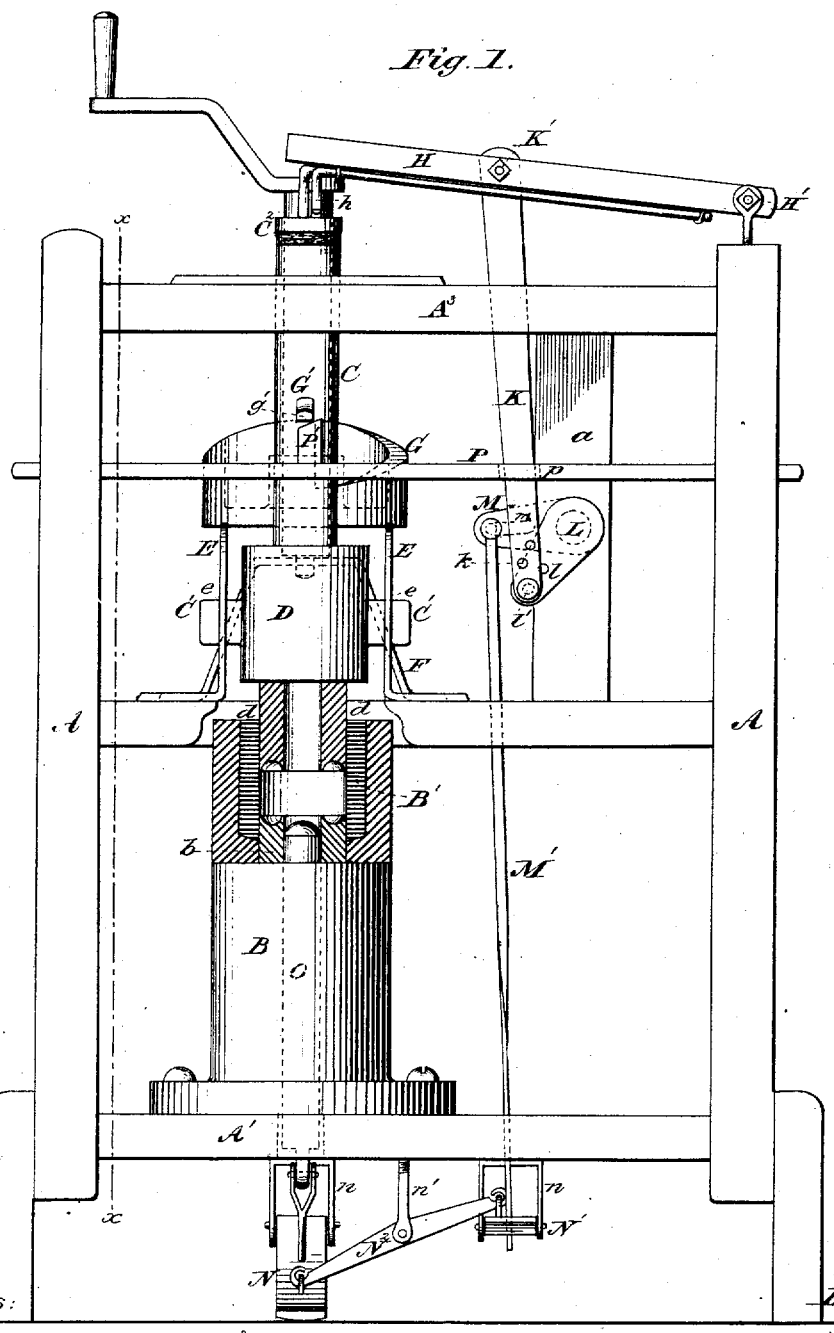
Figure 2:
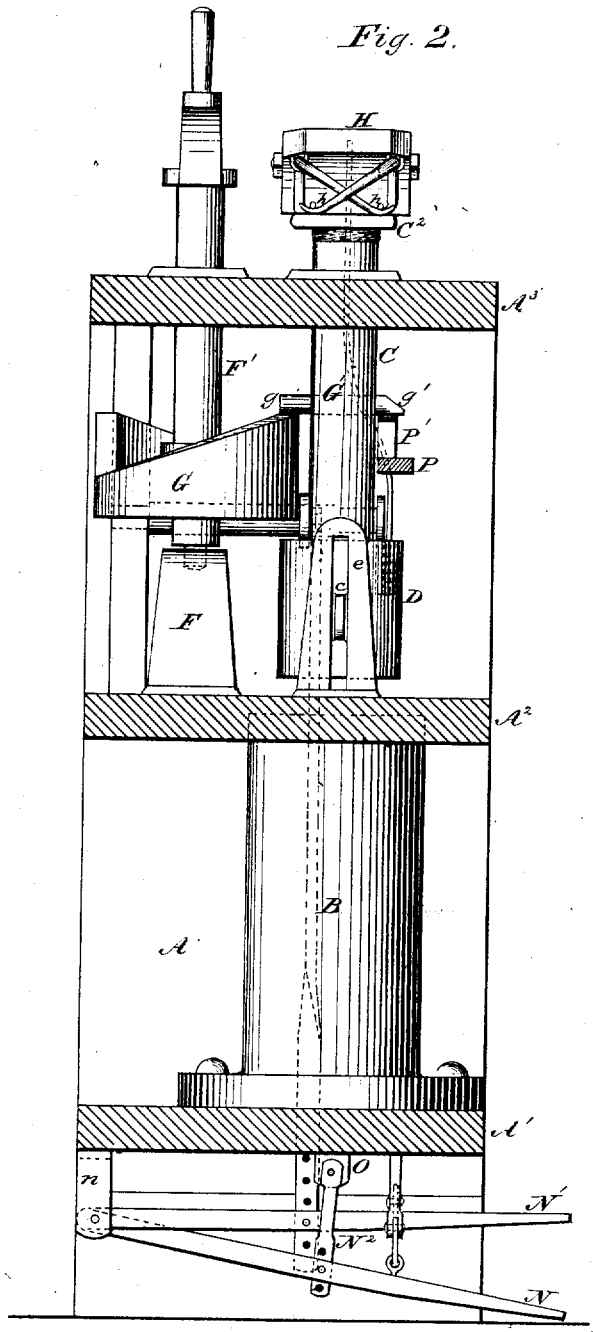

Figure 1 is a front view. Fig. 2 is a vertical sectional view on the line *x x*, Fig. 1.

The nature of my invention consists in securing the stationary die in a closely-fitting cylindrical die-box, and in which, also, the movable die travels, the same being so arranged, as it were, as to closely confine the section of the link during the process of its being welded, and thus cause the excess or surplus of metal to be distributed toward the front of the dies, or in the direction of the body of the link.

The nature of my invention also consists in providing the section of the die-block through which the traveling die works with a detachable steel packing, which allows of its being removed when unduly worn, or replaced by another of a different diameter, and which allows of the same die-block being used with different-size dies, as more particularly pointed out hereinafter.

The nature of my invention also consists in arranging the head of the plunger in such manner, in connection with the hinged bed-plate of a spring, that, as the plunger is elevated by the cam, it shall so lift the bed-plate as to cause an arm attached thereto to move a horizontal sliding bar so as to drive its stop in such contact with a pin on the plunger-shaft that it shall hold the latter free from contact with the cam until, through the action of a treadle, the sliding stop-bar is returned.

The nature of my invention also consists in so attaching the oscillating arm of the spring bed-plate to a crank connected with the treadle-axle as to permit of the tension or force with which the spring shall act or drive the plunger being regulated at pleasure.

The nature of my invention also consists in so connecting the treadle-rod with its axle that as the same is turned, through the action of the oscillating bar connected with the bed-plate of the spring, the rod shall elevate one treadle and so depress the other, and the one which carries the movable tongue-bearing pin of the link, as to withdraw the same automatically, thus leaving the link free to be removed after it has been welded through the action of the dies.

My invention also consists in employing, in connection with the stationary die, a traveling tongue or frog which works through a vertical annular opening formed at the center of said die, the tongue or frog being so arranged, in connection with suitable operating mechanism, as to permit of its being forced up through the die to provide an inner bearing for the link during the process of welding, and of its withdrawal after the operation is finished, so as to facilitate its removal.

The construction and operation of my invention are as follows: A is a rectangular frame, which supports the entire operating mechanism. On the base-board A of the frame is seated the hollow die-block B, in which is secured, by means of a screw or other attachment, the circular grooved or recessed die *b*. B′ is a curved steel packing that is fastened in the die-block, and extends from the upper section of the same down to a point below the face of the die *b*, thus filling the entire section of the block through which the traveling die *d* operates. This packing B′ is to be so secured as to be detachable at pleasure, which permits of dies of different sizes being used, or the replacement of the packing when, through frictional contact, it becomes so worn as no longer to insure the true action of the dies *b d*. This die-box, it will be seen, closely confines or fits snugly around the rear and lateral surfaces of the die, and which causes it to arrest the spreading of the excess of metal at the rear, and compels it to be forced toward the main

BEST AVAILABLE COPY body of the link. The result is it is gradually distributed from the center cross-section along the entire welded section of the link. C is the plunger, and is provided with a collar, D. In this collar D is secured, by a bolt-plate, $C^1$, the traveling die *d*, which is a circular grooved or recessed die, and the exact counterpart of the die *b*. When these dies are brought together their concave and convex recesses form, as it were, an annular groove, in which the scarfed and open ends of the link are welded. The arms *c c* of the bolt-plate $C^1$ project out beyond the sides of the collar D, and, in connection with the slotted faces *e e* of the bearing guide-plates E E, in which they act, serve to insure that the traveling motion of the plunger shall be on a true and direct linear line. The bearing-plates E E, as is also the bearing F of the cam-shaft, are secured to the cross-plate $A^2$ of the frame, and which is mortised or otherwise held at or near the center of the same. On this bearing F is secured the cam-shaft F′, which carries the cam-wheel G. The cam-shaft F and the plunger C each work in suitable bearings in the top board $A^3$ of the frame. Through an opening or aperture cut through the plunger-shaft is inserted a pin, G′, which projects beyond the face of the shaft, affording an elevating bearing-pin, *g*, at the rear, against which the cam acts in elevating the plunger, as shown in Fig. 2, and a bearing-pin, *g′*, in front, against which the stop-bar acts when the plunger is held free from all contact with the cam, as clearly shown in Fig. 1. H is the bed-plate, and is provided with a torsion-spring, the lateral lever-arms *h h* of which rest on and act against the cap-plate $C^2$ of the plunger-shaft; or, if preferred, any other style of spring may be used instead of the torsion-spring shown, the same being so attached to the swinging plate as to act on the plunger in its downward movement, to add force and intensity to its blow. This spring bed-plate H is hinged or pivoted at H′ to the side of the frame A, as clearly shown in Fig. 1.

Near the center of the plate H is a slot in which is pivoted, by a bolt, K′, the arm K, and which is so secured as to allow of its free oscillating movement. At the lower section of this arm K are a series of openings or apertures, *k k*, by means of which the arm K is connected with the crank *l* attached to the treadle-axle L. This crank *l* has also a series of perforations, either one of which can be made to register with either of the perforations *k k* of the oscillating arm K, and which permits of the crank and arm being connected by a bolt, *l′*, as clearly shown in Fig. 1. These perforations also permit of the bearing of the arm K being shifted, and thus to draw with greater or less strain, as occasion may require, on the bed-plate during the operation of the machine. Thus it will be seen that the action of the spring is not only controlled but the degree of its tension is regulated by the arm K. The axle L that carries the crank *l*, to which the arm K is attached, is journaled in suitable uprights *a a*, secured between the middle and upper boards $A^2$ $A^3$ of the frame, and this axle L carries, in addition to the crank *l*, the crank M, in the slotted face *m* of which is secured the treadle-arm M′. N $N^1$ are treadle-plates, and are secured in suitable bearings *n n* at the rear section of the frame A, as clearly shown in Fig. 1. The forward section of these treadle-plates N $N^1$ is attached to a pivoted bar, $N^2$, in such manner that as one is elevated the other is depressed. This pivoted bar $N^2$ is secured in a vertical arm, *n′*, attached to the under face of the base-board $A^1$. To the treadle N is secured the vertical sliding tongue O, which, after the link to be welded has been placed on the die *b*, is forced up so as to afford an interior bearing for the same, and serves to retain it in proper position for the action of the traveling die *d*. To the treadle $N^1$ is attached the arm M′. P is a sliding stop-bar, and works horizontally in suitable bearings in the opposite sides of the frame A. This bar is provided with a shoulder or stump P′, which has an inclined head. When this shoulder, through the action of the bar, passes under the pin *g′* on the plunger, it elevates the same, so as to hold the plunger free from all contact with the cam G until the bar, through the action of the arm K, is returned. This arm K passes through a slot, *p*, in the sliding-bar P, and thus automatically moves the same backward and forward.

From the foregoing description the operation of the machine will be readily understood. Power from an engine or any other suitable source is applied to the shaft F′, which, through the cam G acting against the pin *g*, elevates the plunger; but as the plunger is being elevated, its cap-plate $C^2$ so lifts the bed-plate H as to cause its oscillating arm K to so move the sliding stop-bar P as to drive its shoulder P′ under the pin *g′* of the plunger, and to so elevate the latter as to hold its pin *g* free from the face of the cam G. This movement of the arm K has also, through the crank *l*, so turned the axle L as to cause it, through the crank M and rod M′, to elevate the treadle $N^1$, and which has correspondingly depressed the treadle N, which so withdraws the tongue O as to leave its head below the face of the inferior die *b*. The machine is now in position, as clearly shown in Fig. 1, and is in the desired position for the reception of the link that is to be welded. The link, having its open edges properly scarfed, and having been heated in a blacksmith's or other suitable furnace to a welding heat, is now introduced for the action of the dies. The operator, with his foot, now depresses the treadle $N^1$, which instantly elevates the treadle N, and which movement instantly drives the tongue O up through the slot in the link, where it serves to steady and retain the latter for the action of the dies; but this depression of the treadle $N^1$ has, through the rod M′, so acted on the axle L and its crank *l* as to swing back from its advanced position the oscillating arm K, and it returns the stop-arm P, leaving the bearing-pin $g'$ of the plunger free from contact with the shoulder P′ of said arm, and consequently the opposite bearing-pin $g$ now falls on the face of the cam. The plunger, being now free to act, falls, the accumulated tension of the spring adding force and intensity to the blow. This fall of the plunger through the action of the dies $b$ $d$ welds the link. As the plunger is again elevated it serves to lift the bed-plate as before. It again, through the arm K, so moves the sliding-bar as to arrest and hold the plunger, and also, through the axle L, crank M, and rod M′, elevates the treadle $N^1$, which so depresses the treadle N as to withdraw the bolt or tongue O, and which permits of the welded link being withdrawn and another inserted.

What I claim as new, and desire to secure by Letters Patent of the United States, is—

1. The cylindrical hollow die-box B, constructed as shown, a stationary die, $b$, and a traveling-die, $d$, the same being combined and arranged to operate substantially as described.

2. The combination of the detachable dies $b$ $d$, die-block B, plunger C, collar D, and cam-wheel G, operating substantially as described.

3. The die-box B having a detachable steel packing, $B^1$, when the latter is secured so as to operate in connection with dies $b$ $d$, substantially as described.

4. The combination of the hinged base-board H, having a torsion or other spring attached, and so relatively arranged as to act in connection with the upper section of the plunger, as stated, pivoted arm K, crank-arm $l$, and axle L, the same operating substantially as described, and for the purpose specified.

5. The combination of sliding bar P, having a slot, $p$, and stop-pin P′, arm K, base-board H, and plunger C, the same being so arranged that as the plunger is elevated the sliding bar shall be so moved as to arrest its motion at the proper time, substantially as described.

6. The combination of the sliding stop-bar P, arm K, base-board H, axle L, crank-arms $l$ M, and treadle $M^1$, operating substantially as described.

7. In a link-welding machine, a stationary die, $b$, a traveling die, $d$, and the traveling tongue or frog O, the whole being constructed, combined, and arranged to operate substantially as described.

8. The combination of the double treadle N $N^1$, the pivoted arm $N^2$, traveling bearing-tongue O, and hollow die-block B, operating substantially as described.

9. The combination of the double treadle N $N^1$, pivoted connecting-arm $N^2$, tongue-bearing pin O, rod M′, axle L, arm K, bed-piece H, and plunger C, operating substantially as described.

In testimony whereof I have signed my name to this specification in the presence of two subscribing witnesses:

B. HERSHEY.

Witnesses:
C. F. ALVORD,
R. S. HAYWARD.